United States Patent [19]

Hayden

[11] 3,737,848
[45] June 5, 1973

[54] VEHICLE TRANSISTORIZED WARNING CIRCUIT

[75] Inventor: Rodney Hayden, Stoney Creek, Ontario, Canada

[73] Assignee: TRW Inc., Cleveland, Ohio

[22] Filed: Aug. 5, 1971

[21] Appl. No.: 169,399

[30] Foreign Application Priority Data

June 18, 1971 Canada..................................115,987

[52] U.S. Cl..............................340/52 D, 307/10 LS
[51] Int. Cl. ..............................................B60q 5/00
[58] Field of Search..................340/52 R, 52 D, 52 F; 307/10 LS, 10 R

[56] References Cited
UNITED STATES PATENTS 3,646,511   2/1972   Holt....................................340/52 D Primary Examiner—Alvin H. Waring
Attorney—Philip E. Parker, Gordon Needleman, James R. O'Connor et al.

[57] ABSTRACT

An electrical circuit including a source of voltage, a transistor, and two switches. The source of voltage and two switches each being connected to a different electrode of the transistor and a normally closed relay connected in series whereby actuation of the two switches will cause the relay to buzz or chatter.

3 Claims, 3 Drawing Figures

Patented June 5, 1973

3,737,848

INVENTOR
RODNEY HAYDEN
BY
Gordon Needleman
ATTORNEY

VEHICLE TRANSISTORIZED WARNING CIRCUIT

SUMMARY OF THE INVENTION

This invention relates to a buzzer circuit for automotive use.

It is a great convenience for a driver of a motor vehicle to have a signal which will inform him when lights have been left on or the key has been left in the ignition. It is usual in this case to provide either a flashing light or a buzzer as a signal indicating the inadvertant condition. Prior art circuitry which accomplished the varying function has disadvantages which will be set out more specifically hereinafter.

The present invention avoids the disadvantage of the prior art.

An object of the present invention is to provide a buzzer circuit using a transistor as a switching device.

A further object of the present invention is to provide a buzzer circuit which can be activated by different conditions.

A still further object of the present invention is to provide a buzzer circuit which causes a single buzzer to be activated by different conditions.

DESCRIPTION OF THE PREFERRED EMBODIMENT

Figure 1:
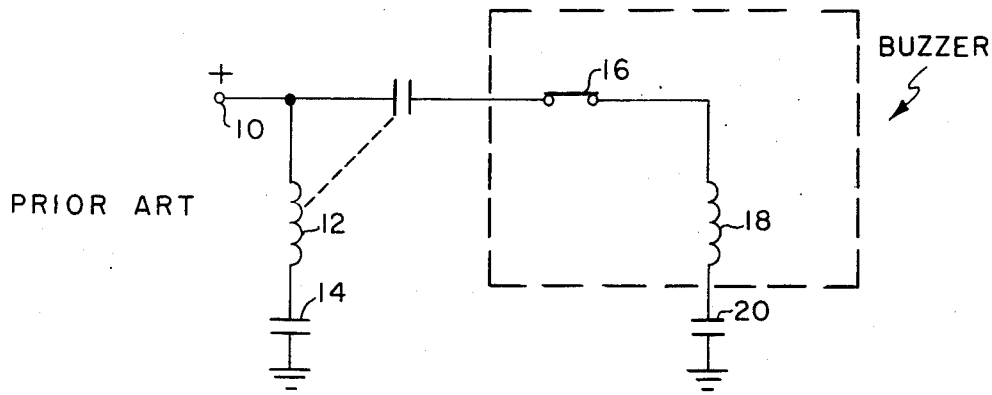
FIG. 1 is a schematic of a prior art circuit.

In the drawing there is shown in FIG. 1 an example of a prior art method of providing a buzzer signal to the driver indicating that the key has been left in the ignition of the automobile. The circuit comprises the plus aide 10 of a DC power source in series with a relay coil 12 and a switch 14 in the ignition of the automobile and then to ground. The ignition switch 14 is activated when the key is in the ignition. The contacts of the relay coil 12 are in series with the plus side 10 and with the normally closed contacts 16 of a relay having a relay coil 18 which in turn is in series with the door switch 20 and thence to ground.

If a key should be in the ignition thereby activating the ignition switch 14 and the door should be open thereby activating the door switch 20, current will flow causing the contacts 16 to buzz or chatter. In the United States when automobiles are shipped from the factory, the ignition key is put into the ignition which partially activates the circuit through the coil 12 causing a sever drain on the battery that would ultimately wear the battery out if left for a period of time.

Figure 2:
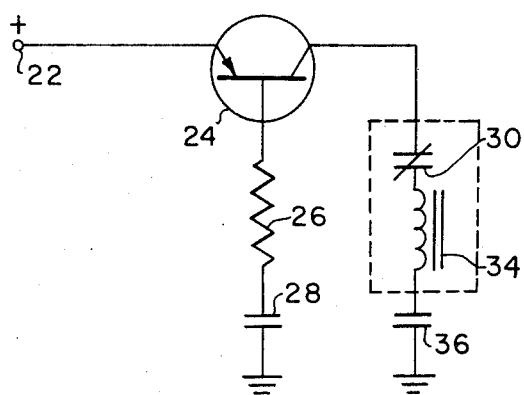
FIG. 2 is a schematic of a mode of the invention.

The circuit shown in FIG. 2 discloses a positive source of voltage 22 which is connected to the emitter of a PNP transistor 24. The base of the transistor 24 is connected through a resistor 26 with an ignition switch 28 and thence to ground. The collector of the transistor 24 is connected to the normally closed contacts 30 of a coil 34 whose other end is connected in series with a normally open door switch 36 and thence to ground.

If the key switch 28 is closed there would be a very slight drain on the battery through the emitter base junction, however, this drain would be very much less then that drain in the circuit shown in FIG. 1.

In order to operate the buzzer of FIG. 2, the key would have to be left in the ignition, actuating the ignition switch 28 and then dhe driver's door would have to be open, actuating the door switch 36. Under these circumstances, the transistor 24 would conduct, applying a current to the coil 34 which will cause the normally closed contacts 30 to open, cutting off the current and thereby causing the coil to turn off which in turn would cause the normally closed contacts to return to their proper positions, hence the cycle would then repeat itself.

Figure 3:
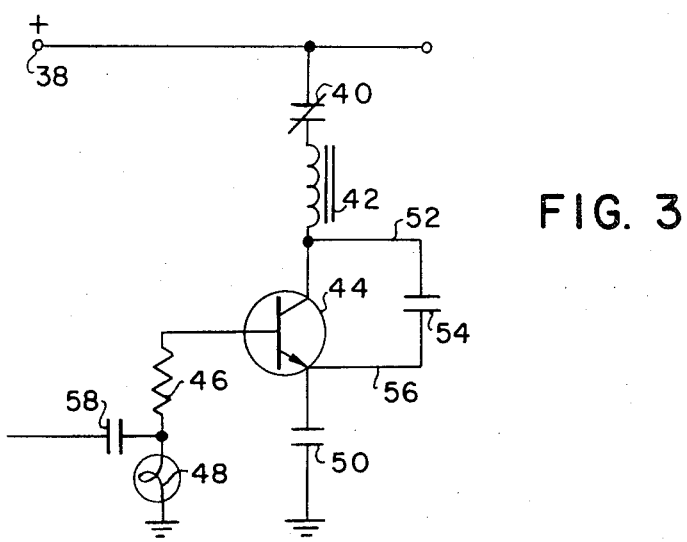
FIG. 3 is a schematic of another mode of the invention.

The inventor's circuit as shown in FIG. 3 comprises the plus side 38 of a DC power source in series with the normally closed contacts 40 of a relay in series with its coil 42 and with the collector of a NPN transistor 44 whose base is connected with the biasing resistor 46 and a headlamp 48 to ground. The emitter of the transistor 44 is connected to ground through a door switch 50. A line 52 is connected between the coil 42 and collector of the transistor 44 to an ignition or key switch 54 and thence to a line 56 which connects at a point between the door switch 50 and the emitter of the transistor 44. In effect the key switch 54 and its connections shunt the transistor 44. A head light switch 58 is connected in series with the biasing resistor 46 after it is connected with a line leading to ground through the head lamp 48.

With a circuit of this nature there are several possible conditions which can exist. One condition is that the head light switch 58 will be open, the door switch 50 will be open and the key switch 54 will be open, obviously, the circuit will not carry any current. Another condition is that the door switch 50 is activated due to the fact that the door is open and the head light switch 58 is also activated; under these circumstances the transistor 44 will conduct and the contacts 40 will buzz or chatter. Prior to closing the switch 58 there is no plus voltage on the base of the transistor and it will not conduct. When the switch 58 is closed and if the door switch 50 is closed, then the transistor 44 will conduct and the buzzer will be activated. Still another condition is that the door switch 50 is activated and the key switch 54 is also activated due to the facts that a key is in the ignition and the door is open. In these circumstances, a current will pass through the coil 42 and the contacts 40 will buzz or chatter.

With this circuit the fact that the key is left in the ignition, though activated, the ignition switch 54 will not cause a drain on the battery since there is no circuit established until the door switch 50 is activated.

With reference to the foregoing description it is to be understood that what has been disclosed herein represents an embodiment of the invention and is to be construed as illustrative rather than restrictive in nature and that the invention is best described by the following claims.

I claim:

1. A buzzer circuit for automotive use including a transistor, an ignition switch and another switch, a source of voltage and a relay having a coil and normally closed contacts, the source of electricity connected to one electrode of the transistor, the ignition switch connected to a second electrode of the transistor and the other switch connected to the third electrode of the transistor and the relay having its coil in series with its normally closed contacts and connected to only one electrode of the transistor whereby actuation of both switches places the transistor in a conducting state and causes the normally closed contact to open.

2. A buzzer circuit for automotive use as set forth in claim 1 wherein the source of voltage is connected to the emitter and is a positive source, the ignition switch is connected to the base and the other switch is connected to the relay, the transistor is a PNP transistor and the relay is connected to the collector.

3. A buzzer circuit for automotive use as set forth in claim 1 wherein the relay is connected in series between the source of voltage and the collector of the transistor, the ignition switch is connected in series with the emitter and ground potential, the other switch is connected to the base of the transistor, the transistor is an NPN transistor and the source of voltage has a positive polarity.

* * * * *